United States Patent Office 3,004,918
Patented Oct. 17, 1961

3,004,918
PRODUCTION OF MAGNETIC FERRITE BODIES
Frank J. Schnettler, Morristown, N.J., assignor to Bell Telephone Laboratories, Incorporated, New York, N.Y., a corporation of New York
Filed May 1, 1956, Ser. No. 581,858
2 Claims. (Cl. 252—62.5)

This invention relates generally to a method of making magnetic bodies, and to the magnetic bodies so made.

More specifically, this invention relates to a method of making magnetic ferrite bodies, and to the ferrite bodies so made.

Ferrite materials, which have the generalized formula $MFe_2O_4$, where M may be one or more of a number of metals such as zinc, cobalt, nickel, copper, manganese, and magnesium for example, are generally formed into massive structures by a technique well standardized in the art. This process comprises a mixing and grinding, usually by ball-milling, of all the constituents, followed by filtering and sintering. To insure homogeneity the sintered material is commonly reground and remilled, and fired agin. The cycle from milling to sintering may be repeated several times in some instances.

After substantial homogeneity of the composition is assured, the sintered material is finally ground, mixed with lubricants and binders, pressed to the shape of the desired detail, and fired. In such pressed and fired bodies of homogeneous composition, the magnetic and electrical properties of the bodies, such as their permeability, $\mu$, and their quality factor, Q, are determined principally by the chemical composition of the ferrite, $MFe_2O_4$, from which they are made. The properties of the ferrite are determined by its chemical composition as a ferrite, and the properties of the pressed detail are similarly limited to those of its homogeneous constituent. To effect a change in the properties of the bodies, a resort to alteration in their gross physical structure must be made.

By the methods of the present invention it is possible to control some properties of a massive ferrite detail not only by choice of its chemical constituents and alteration of gross physical aspects of the detail, but by control over critical steps in its manufacture. More specifically, for a massive detail of given shape, containing a ferrite of essentially fixed chemical constitution, it is possible to control the overall permeability of the detail by process control of factors introducing an equivalent air gap into the fired body.

The introduction of an air gap into a ferrite detail lends temperature stability to the value of the permeability of the detail. The use of a detail, as a core in a winding for example, may subject the detail to considerable variation in temperature. The permeability of the detail over the temperature range encountered, if the detail has an air gap, will vary much less than for an equivalent detail which lacks an air gap but is exposed to the same temperature changes. The introduction of air gap results in a lowering of the permeability of the whole detail, but the temperature stabilization of the permeability achieved in this manner is usually considered more useful in the detail than is a high, temperature-unstable permeability value.

The introduction of an air gap into a ferrite detail is a desirable end. When the introduction of a discrete discontinuity in the structure of a homogeneous ferrite detail is used to increase air gap, however, stray flux may be created in the region of the discontinuity which detracts from the increased utility of the detail given by the air gap. For example, stray flux lines escaping from a device in the region of a discrete air gap may cause interaction of the device with neighboring components in an assembly, upsetting circuit parameters.

The method of the present invention incorporates an equivalent, non-discrete, air gap within the microscopic structure of the ferrite, avoiding the creation of irregular fields at a discrete break in the structure. For a given material, the equivalent air gap introduced is variable with changes in the manufacturing steps. The permeability of the ferrite detail is also thus affected and may be chosen at a selected value, balanced with the air gap introduced, to give structures with both optimum permeability and an optimum stabilization of that permeability.

The novel process here disclosed comprises a pre-firing and reaction of some constituents of the ferrite composition, and mixing of these prereacted materials with a high-resistivity, low-permeability matrix of another essential constituent. By firing of this latter mixture, regulated diffusion of some of the matrix material into the prereacted material to form a desired ferrite composition is obtained. Though excessive firing will eventually lead to a homogeneous solid solution of all components through continued diffusion and disappearance of the matrix, at intermediate stages an inhomogeneous structure is obtained.

As some of the high-resistivity, low-permeability matrix constituent diffuses into the prefired component, ferrite grains are formed. The grains, largely isolated from one another by the remaining non-diffused matrix, present a large grain boundary in section. This large boundary, caused by the separation of the ferrite grains with undiffused high-resistivity, low-permeability matrix material, is equivalent in effect to the introduction of a discrete air gap into the structure. By continued firing, more matrix may be diffused into the initially formed ferrite until the ferrite grains touch and eventually coalesce into larger crystals. A continuous decrease in grain boundary and equivalent air gap is thus observed. The process may be terminated at whatever stage will yield a detail of the characteristics desired.

Figure 1:
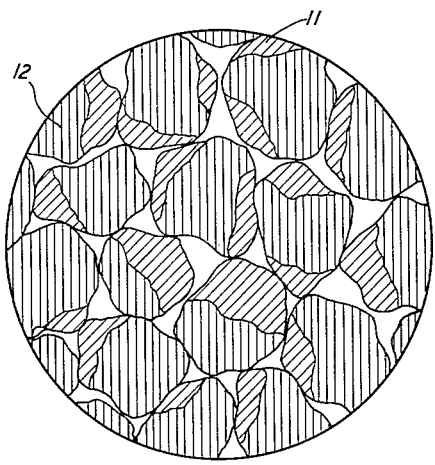
FIG. 1 is an enlarged schematic view of particles of a ceramic mixture, prior to final firing, used to prepare ferrites by methods now known in the art.

In FIG. 1 are shown particles of a ferrite composition prepared by mixing all the oxidic constituents of the ferrite, sintering, and grinding the sintered mass. Sintering the constituents has partially formed ferrite composition 11 which is found with portions 12 of ferric oxide not completely reacted to form ferrite 11. If the mixing, sintering, and grinding steps performed were to be repeated one or more times, the composition could be made more homogeneous.

Figure 2:
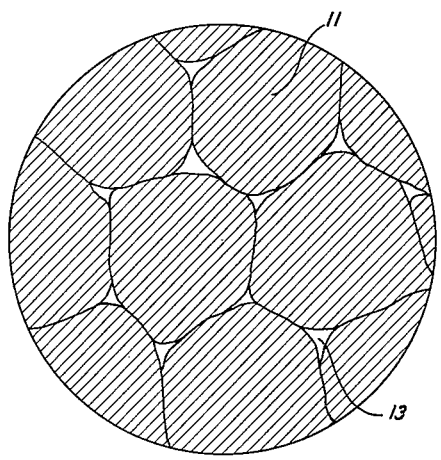
FIG. 2 is an enlarged schematic view of the grain structure of a ferrite prepared by firing the ceramic mixture shown in FIG. 1.

In FIG. 2, the same composition is shown after firing. The sintered and ground particles of FIG. 1 have coalesced into grains of homogeneous crystalline ferrite material 11. Firing has caused diffusion of residual ferric oxide 12, shown in FIG. 1, to give a homogeneous composition. With the exception of a few voids 13, between grains, the grains are in contact throughout the fired material, giving a low-resistivity, high-permeability path throughout the material. This contact between grains decreases the grain boundary of the fired ferrite, the boundary being measured only by those portions of the grain not in contact with other grains. Further firing would cause aggregation of the grains shown into still larger grains, further decreasing the available grain boundary.

Figure 3:
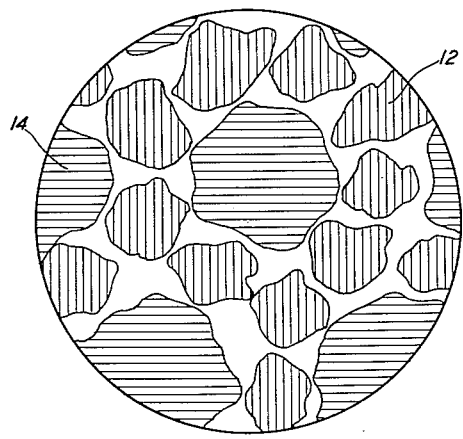
FIG. 3 is an enlarged schematic view of particles of a ceramic mixture, prior to firing, used to prepare ferrites by the methods of the present invention.

In FIG. 3 are shown particles 14 of an oxide composition comprising, for example, all of the oxidic constituents of a ferrite composition except ferric oxide. These oxides have been mixed, sintered, and ground to form an essentially homogeneous composition devoid of iron oxide. As shown in FIG. 3, these prereacted or sintered particles 14 are then mixed with particles 12 of iron oxide in a desired proportion.

Figure 4:
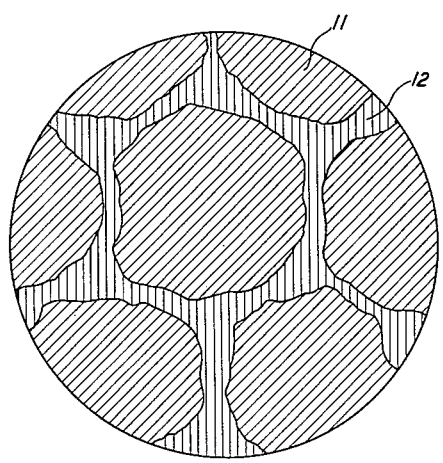
FIG. 4 is an enlarged schematic view of the grain structure of a ferrite, prepared by firing the ceramic mixture shown in FIG. 3.

In FIG. 4 is shown the mixture of FIG. 3 after firing. Iron oxide has diffused into particles 14 of the oxidic mixture of FIG. 3, formerly free of iron, to form crystalline grains 11 of a true ferrite composition. The ferrite grains 11 thus formed remain dispersed throughout a matrix 12 of iron oxide unreacted and undiffused, which separates the crystalline grains of ferrite.

Control of the firing process governs how much iron oxide will diffuse into the non-ferrite grains 14 to form ferrite grains 11. The composition of the ferrite formed, the homogeneity of the ferrite grain itself, and the proportion of diffused to undiffused iron oxide are all determined by the extent of firing. By varying the proportion of iron oxide 12 relative to other oxidic constituents prefired to form oxide material 14, the amount of iron oxide which is to remain as a matrix material for ferrite 11 formed by diffusion can also be governed. It is this unreacted material, shown as iron oxide 12 in the embodiment pictured in FIG. 4, remaining between the grains 11 of ferrite, which gives a large grain boundary in the fired structure and introduces equivalent air gap into the structure.

In the prior art ferrite shown in FIG. 2, as mentioned ferrite grains 11 are in contact with one another, giving a low-resistivity, high-permeability path throughout the entire structure. While there are many crystals, contact between the crystals and coalescence of smaller crystals into larger both decrease the boundary.

In the method of the present invention, the ferrite grains 11, as shown in FIG. 4, are kept separated and out of contact by residual high-resistivity, low-permeability matrix oxide. The grains will vary in size, getting larger with longer firing time, but are usually predominantly present as grains on the order of 10 microns in size. Since the grains are formed by diffusion of components into a non-ferrite grain acting as a nucleus, the ferrite grains are rarely of a size smaller than the nucleating grain. So long as a residual matrix is observed, an equivalent air gap is introduced into the structure. Grains larger than 10 microns in size, if too predominant in the structure, may give ferrites with losses higher than those in finer-grained structures.

For the matrix component, materials with resistivities of about $10^4$ ohms, or greater, are preferred. Permeability values in the matrix should be less than 10, preferably as close to 1 as possible.

As mentioned, an oxide composition containing those constituents of the final ferrite to be produced, exclusive of the ingredient to be used as a matrix, is first produced by firing the constituents chosen. In this step, a substantially homogeneous composition is desired, and a homogeneous single phase is preferred. When ground and mixed with the as-yet-unreacted matrix ingredient of the ferrite, particles of this near-homogeneous or homogeneous single phase prefired composition will be the nuclei for the formation of ferrite by matrix diffusion. If too inhomogeneous a material is formed on prefiring, the composition of a pressed body before final firing may more closely resemble a polyphase system than a binary system containing only a matrix material and a nucleating component. If such a polyphase system is too non-uniform, diffusion of two or more constituents to a given particle may be required for formation of the ferrite desired. The firing required for such diffusion may then be so extensive as to almost eliminate, by concurrent diffusion processes, the presence of a residual matrix between ferrite particles, and the advantages of the invention may be lost.

Though the number of possible constituents of the prefired homogeneous single phase or near-homogeneous composition is, theoretically, unlimited, in practice it is more difficult to find compatible materials forming near-homogeneous materials or homogeneous solid solutions as the number of constituents is much increased above two. Such systems, when found, may further be limited in the range over which good compatibility exists. One oxide system which has proved compatible over a broad range and thus especially successful in the practice of the invention is that of manganese oxide-zinc oxide. These oxides form a homogeneous material which in most proportions, if not all, is a homogeneous single phase. The structure of the resultant homogeneous phase is not known, nor is its structure critical. The solid solutions of most interest form when the value of the ratio of manganese ions to those of zinc ions present lies between 0.75 and 4, inclusive of the limits. Particularly desirable ferrites can also be formed from mixtures containing a smaller proportion of manganese, as when the ratio above lies between 0.75 and 1.5. Ferrites with most useful Curie temperatures are formed when the manganese-zinc ratio has a value between 1.0 and 1.3, an optimum value of the ratio being 1.09.

After firing, the homogeneous solid solutions or near-homogeneous phases mentioned above will be composed of oxides. However, before firing, the materials used need not be oxides, and indeed may preferably be compounds other than oxides. As known in the art, the formation of ferrites from metallic oxides or other compounds is dependent in part on the choice of reactive starting materials. This reactivity, which is a measure of the east with which the component ingredients will diffuse, dissolve, or form compounds with each other, is partly a function of particle size, partly a function of crystal perfection, and may be dependent on other unknown factors. To ensure reactivity, the metallic constituents of a ferrite-forming composition are usually obtained by methods or from sources known to give reactivity, or as compounds, oxides or otherwise, whose common form is known to be reactive.

In the formation of manganese-zinc ferrites, for example, zinc is usually introduced as the oxide. Reactive zinc oxide may be obtained by direct oxidation of metallic zinc. Manganese is commonly introduced as the carbonate, as metal carbonates are generally reactive in the sense here meant. Ferric oxide obtained by roasting recrystallized ferrous sulfate is a reactive grade of iron oxide suitable for use in compounding ferrites. As is further known in the art, nickel ions are commonly added as nickel carbonate or nickel oxalate, cobalt as the carbonate, magnesium as the carbonate, aluminum as the hydroxide, and copper may be added suitably as almost any compound convertible to the oxide.

Generally speaking, commercial C.P. reagents of the oxides, carbonates, and other compounds mentioned above are reactive, and may be conveniently used in the preparation of ferrites.

In preparing the prefired phase, once the components thereof have been chosen, the materials are mixed, with or without a preliminary dry mix, in a paste mixer as a slurry. An aqueous slurry is generally used, though a non-aqueous liquid, as, for example, acetone, carbon tetrachloride or ethanol may also serve. In case the mixture to be prereacted contains water-soluble components, mixing in non-aqueous solvents is preferred.

After thorough mixing, the paste or slurry is dried by removal of the supernatant fluid by filtration, or, if a volatile liquid has been used, by evaporation.

The dried, mixed material, for example consisting of zinc oxide and manganese carbonate in near equimolar proportions, is then prereacted by calcination. For the case of manganese-zinc, firing in air for 15 hours at 900° C. is sufficient to convert the manganese carbonate usually used to manganese oxide, and to react the two oxides to form a homogeneous single phase. In the prefiring stage, firing times between 10 hours and 20 hours will usually be sufficient to react the components. Temperatures of 800° C. to 1000° C. are conveniently used. Neither time nor temperature is critical, so long as the prefiring accomplishes the formation of an essentially homogeneous material preferably consisting of a single phase. After firing, the material is ground to a particle size between 0.5 micon and 5 micons by ball-milling. Particles about 1 micron in size are preferred.

Mixture of the calcined and ground prereacted portion with the matrix constituent follows. The matrix material is also first ground to between 5 microns and 0.5 micron in size, with particles about 1 micron in size being preferred. Generally iron oxide is chosen as the matrix constituent, as it is predominantly present in most ferrite compositions and may conveniently be added in excess. Its permeability is low, essentially 1, and its resistivity is about $10^{14}$ ohms. The amount of matrix material added will usually vary, by choice, between the stoichiometric amount required for ferrite formation on complete reaction with the prereacted component and an upper limit set by the amount of equivalent air gap sought to be introduced. For iron, the amount of iron oxide used will thus usually vary to give an iron atom content between 66⅔ atom percent of total metal atoms present and 80 atom percent of such total metal content. The lower limit corresponds to the iron stoichiometrically necessary in a ferrite, $MFe_2O_3$. The upper limit has been found by experience to encompass most compositions of interest. When the stoichiometric quantity of iron oxide mentioned is used, it will be understood that there is incomplete reaction of the prefired oxide mixture to form ferrite, as some iron oxide is to remain undiffused as the matrix material. If complete conversion of all the prefired oxide mixture is desired, and yet some matrix iron oxide is to remain, an excess of iron oxide over the stoichiometric quantity, for example enough oxide to yield between 67 atom percent, or 68 atom percent, and 80 atom percent of iron atoms in the total metal atom content is employed. Complete conversion of the prefired oxides to ferrite is not required for the result wanted, however.

Again, using the manganese-zinc ferrite system as illustrative, between 66⅔ atom per cent and 80 atom percent of iron is added as $Fe_2O_3$ to the prefired ground manganese oxide-zinc oxide solid solution. The percentages mentioned are calculated on the basis of total metal atoms present. In this system, iron atom percentages between 66⅔ atom percent, and 75 atom percent have been found particularly useful.

In the manganese-zinc ferrites, zinc oxide would not be preferred as a matrix material, because manganese oxide and iron oxide, as the prereacted constituents, fail, on calcining, to form a homogeneous composition with ease. Zinc oxide and iron oxide can be prereacted to form a quantity of zinc ferrite diluted with excess iron oxide, and manganese oxide used as the matrix. Such procedure though operative, is also not preferred, however. As mentioned earlier, for manganese-zinc ferrites it is preferred to use iron oxide as the matrix, prefiring the remaining materials. However, for other systems and purposes, prereaction of iron oxide and a choice of another component as the matrix may be indicated.

Operationally, the mixing of the calcined, prereacted phase with the matrix phase, usually iron oxide, follows procedures known to the art. Thorough crushing of the calcined portion and thorough mixing with the iron oxide are assured by a 5 hour to 15 hour period of ball-milling. Reduction of all particles to between 0.5 micron and 5 microns, preferably to a size of about 1 micron, can be accomplished in this step. A liquid, such as water, ethanol, carbon tetrachloride or acetone is preferably used in the ball-mill.

A binder and lubricant may be added to the ceramic material during this ball-milling. Polyvinyl alcohol or "Opal Wax" (hydrogenated castor oil) are useful binders when ball-milling with water. Paraffin or "Halowax" (chlorinated napththalene) are useful with non-aqueous solvents such as carbon tetrachloride. The binder may be added either as a solid, to be dissolved in the solvent used in the ball-milling, or already in solution in a solvent. For "Halowax," which is most commonly used, an amount of wax equal in weight to 10 percent of the weight of the ceramic solids gives best results. For the other binders mentioned, smaller quantities are usual.

After completion of the milling, the solvent may be removed by evaporation during which the ceramic material and the binder residue are stirred to disperse the binder uniformly throughout the inorganic mixture.

The resultant dried material, in which the binder is also to act as a lubricant during subsequent shaping steps, is preferably then granulated to size. This may be accomplished by forcing the material through a sieve, for example. A No. 20 Standard sieve, with a mesh opening of 0.84 millimeter, has been used successfully. The granules are then formed under pressure into a shaped massive ferrite body, pressures of from 10,000 pounds per square inch to 50,000 pounds per square inch being employed.

After shaping, the pressed articles are preferably "dewaxed" by heating in air. A convenient dewaxing schedule comprises bringing the pressed parts to a temperature of 400° C. over a period of 6 hours and then maintaining a 400° C. temperature for another 6 hour period. This dewaxing step, designed for articles of intermediate size, may be modified by lengthening or shortening the heating period for larger or smaller bodies.

Final firing is usually done in an oxygen-containing atmosphere at temperatures between 1050° C. and 1350° C. For most purposes firing at temperatures between 1075° C. and 1200° C. are used, and the range of temperatures between 1100° C. and 1150° C. has proved particularly useful.

As mentioned, oxygen is usually added to the firing atmosphere. Amounts of oxygen between 0.5 percent and 2 percent, by volume are preferred. As the non-oxidizing constituent, an inert gas is chosen. Though the rare gases for example may be used, nitrogen is the inert gas usually chosen for reasons of economy and convenience. A mixture of nitrogen containing 0.85 percent of oxygen by volume has been used with special success.

The time for which firing is continued, as it is in part regulatory of the properties of the final body by controlling the extent of diffusion occurring, is in the discretion of the operator. A minimum period of a few hours is, of course, prerequisite to any measurable diffusion and formation of the ferrite compound desired. Too extensive firing will result in complete diffusion of all constituents and, thus, destruction of the equivalent air gap by disappearance of the high resistivity matrix. Then also, the choice of temperature influences the speed of diffusion, higher firing temperatures requiring shorter periods of firing for similar results.

For temperatures between 1100° C. and 1150° C., a minimum firing time of three hours has been found requisite for most materials. Firing for periods much longer than 48 hours usually destroys substantial portions of the matrix material and gives a ferrite indistinguishable from those prepared by conventional methods. Within these limits, the period of firing is optional with the operator and is determined by the requirements he sets for the finished material.

The effect of varying firing time is apparent from the following examples. Both compounds illustrated are manganese-zinc ferrites prepared by a mixing of manganese carbonate and zinc oxide in quantities sufficient to give the manganese-zinc atom ratio noted. This compounding was followed by calcination of the mixed materials for 15 hours at 900° C. The prefired materials were then mixed with iron oxide in the amounts indicated, ball-milled for 5 hours to 15 hours, pressed, and fired at 1130° C. in an atmosphere of nitrogen containing approximately 0.85 percent oxygen. Cooling was accomplished at a rate of 100° C. per minute.

*Example 1*

Constituent: Atom percent present
Fe _____ 71.0
Mn _____ 15.8
Zn _____ 13.1
Ratio Mn/Zn=1.21.

| Time of firing | $\mu$ | Q | $\mu$Q |
|---|---|---|---|
| 6 hours | 208 | 260 | 54,000 |
| 10 hours | 478 | 226 | 108,000 |
| 40 hours | | | |
| 48 hours | 1,030 | 183 | 188,500 |

*Example 2*

Constituent: Atom percent present
Fe _____ 74.0
Mn _____ 14.3
Zn _____ 11.7
Ratio Mn/Zn=1.22.

| Time of firing | $\mu$ | Q | $\mu$Q |
|---|---|---|---|
| 6 hours | 134 | 640 | 85,800 |
| 10 hours | 317 | 331 | 104,000 |
| 40 hours | 684 | 230 | 157,000 |
| 48 hours | 842 | 215 | 181,000 |

The permeabilities, $\mu$, listed are values measured at a field strength of 6 gausses, and are, essentially, intial permeabilities. The quality factor values, Q, are for the materials at a frequency of 100 kilocycles under the same conditions of measurement.

In both examples, it can be seen that increased firing, by diffusing the matrix component into the already formed ferrite, causing a decrease in equivalent air gap, decreases Q and increases $\mu$. That the increase in permeability is due, however, to more than a decrease in equivalent air gap alone is shown by the parallel increase in the $\mu$Q product. If an air gap or equivalent air gap were being decreased, without more, permeability would increase as observed, but the $\mu$Q product would be essentially invariant. The change in permeability is in part due to removal of equivalent air gap by assimilation of the matrix, but is also due to increased ferrite formation, changes in composition of the ferrite already formed, and increasing homogenization of the ferrite containing grains originally produced. These latterly mentioned effects are also caused by and concomitant with increased diffusion of the matrix compound.

The examples illustrate, then, that one point of control over the permeability and quality factor values in a given case lies in the extent of firing.

By comparison of the examples, the effects of changing the quantity of matrix material, here iron oxide, in the composition are also apparent. Both compounds contain near equivalent amounts of manganese and zinc, as indicated by the manganese-zinc ratio. In Example 2, however, an increased proportion of iron has been added, resulting in increased grain boundary length in the partially fired materials. The equivalent air gap remains consistently higher in the material of Example 2, while the permeability values are consistently lower, though the $\mu$Q products of the details in Examples 1 and 2 are comparable. The introduction of more matrix iron oxide has thus been used as another control, other than composition alone, over the permeability and quality factor of the ferrite, as mentioned herein earlier.

The balance of these variables, that is between the quantity of matrix material to be added and the period for which final firing is to last, is one that is best struck by one practicing the invention on the basis of empirical results. If a chosen fixed period for firing gives a composition with too small an air gap and, in consequence, too low a permeability stability for the purposes for which it is intended, the same ferrite, but with increased matrix material, may be suitable. By variation of the two parameters, firing time and quantity of matrix material, with a constant ferrite composition in mind, a particular value of $\mu$ and of equivalent air gap may be obtained at $\mu$Q value consonant with the operator's choice. Other ferrite compositions, in which the nature or composition ratios of non-matrix materials may be altered, may also prove suitable to achieve certain permeability values in a ferrite having a certain value of the $\mu$Q product. The variations and possibilities are too numerous to permit delineation in detail, but are circumscribed by the principles and descriptions given hereinbefore.

The presence of equivalent air gap in the ferrites shown in Examples 1 and 2 above is illustrated by the following comparison. Ferrite rings of composition and $\mu$Q value comparable with ferrites illustrated in Examples 1 and 2, but of different permeability value because of the absence of an air gap, were prepared by prior art methods. Discrete air gaps were cut into the prior art materials and the width of the discrete air gap required to give permeability values equal to those found in the ferrites containing equivalent air gap was calculated from measurements made under conditions similar to those described in Examples 1 and 2.

The prior art ferrites were manganese-zinc materials for which the ratio of manganese ions to zinc ions was 1.2. The materials were compounded to have iron present as 66⅔ percent of the total metal atoms. All ingredients were mixed and sintered, then ground, shaped, and fired as in the standard prior art procedure.

One of the prior art ferrites was fired for 10 hours at 1130° C. and had a $\mu$Q product of 108,000. This material was compared with the samples of Examples 1 and 2 fired for 10 hours, which had $\mu$Q values of 108,000 and 104,000 respectively, as noted. Discrete air gaps 1 mil to 4 mils in width, at 1 mil intervals, were introduced into the prior art ferrite. From the resultant curve of permeability versus width of discrete air gap, it was calculated that an air gap 1.6 mils in width would be required to give the prior art material a permeability of about 480, the permeability found in the sample of Example 1 fired for 10 hours. To get a permeability of about 315, as for the sample of Example 2 fired for 10 hours, a discrete air gap 4.1 mils wide would be required in the prior art ferrite.

A second ferrite prepared by prior art methods and fired for 15 hours at 1130° C. had a $\mu$Q product of 175,000. Comparison was made with the samples of Examples 1 and 2 fired for 48 hours and having $\mu$Q products of 188,500 and 181,000 respectively. A discrete air gap of 0.4 mil would be required to bring the permeability value of the value of the prior art material to approximately 1030, that shown by the sample of Example 1. For a permeability value of about 840, as in Example 2, a discrete gap 0.7 mil wide would have to be cut in the prior-art-prepared ferrite.

What is claimed is:

1. The method of making ferrite bodies having a large grain boundary which comprises sintering together for 10 to 20 hours at 800° C. to 1000° C. manganese carbonate and zinc oxide to form a homogeneous solid solution of manganese oxide and zinc oxide in which the ratio of manganese ions to zinc ions has a value between 1.0 and 1.5, mixing said sintered solid solution with only ferric oxide sufficient to give between 66⅔ atom percent and 75 atom percent of iron in the total atoms of metals present, shaping a body from the resultant mixture, and firing said shaped body in an atmosphere containing between 0.5 percent and 2 percent by volume of oxygen at a temperature between 1075° C. and 1200° C. for between 3 hours and 48 hours said temperatures and times being so correlated as to give limited diffusion of said ferric oxide into said sintered solid solution to form a product consisting essentially of grains of manganese-zinc ferrite dispersed in a continuous matrix of ferric oxide.

2. A ferrite body made in accordance with the method defined by claim 1.

References Cited in the file of this patent

UNITED STATES PATENTS

| | | |
|---|---|---|
| 2,068,658 | Cox | Jan. 26, 1937 |
| 2,636,860 | Snoek et al. | Apr. 28, 1953 |
| 2,640,813 | Berge | June 2, 1953 |
| 2,700,023 | Albers-Schonberg | Jan. 18, 1955 |
| 2,736,708 | Crowley et al. | Feb. 28, 1956 |
| 2,825,670 | Adams et al. | Mar. 4, 1958 |
| 2,837,483 | Hakken et al. | June 3, 1958 |

FOREIGN PATENTS

| | | |
|---|---|---|
| 524,097 | Belgium | Nov. 30, 1953 |
| 669,571 | Great Britain | Apr. 2, 1952 |
| 679,453 | Great Britain | Sept. 17, 1952 |
| 724,675 | Great Britain | Feb. 23, 1955 |
| 908,717 | France | Oct. 15, 1945 |

OTHER REFERENCES

Gorter: Proceedings of the IRE, December 1955, p. 1954.

Snoek: Physica III, pp. 481, 482, June 1936.